United States Patent
Hartel et al.

(10) Patent No.: US 8,423,797 B2
(45) Date of Patent: Apr. 16, 2013

(54) INITIALIZATION OF A CHIP CARD

(75) Inventors: Karl Eglof Hartel, Munich (DE); Harald Vater, Giessen (DE)

(73) Assignee: Giesecke & Devrient GmbH, Munich (DE)

( * ) Notice: Subject to any disclaimer, the term of this patent is extended or adjusted under 35 U.S.C. 154(b) by 1825 days.

(21) Appl. No.: 10/488,002

(22) PCT Filed: Aug. 27, 2002

(86) PCT No.: PCT/EP02/09561
§ 371 (c)(1),
(2), (4) Date: Jan. 12, 2005

(87) PCT Pub. No.: WO03/021542
PCT Pub. Date: Mar. 13, 2003

(65) Prior Publication Data
US 2005/0120226 A1 Jun. 2, 2005

(30) Foreign Application Priority Data

Aug. 30, 2001 (DE) .................................. 101 42 351

(51) Int. Cl.
*G06F 12/14* (2006.01)
(52) U.S. Cl.
USPC ............................... 713/194; 713/182; 726/9
(58) Field of Classification Search ............... 713/189, 713/190, 191, 192, 193, 194, 185, 182, 179, 713/181; 726/9, 4, 2, 16, 17, 20; 340/10.3, 340/14.61; 705/65–67; 235/380, 381
See application file for complete search history.

(56) References Cited

U.S. PATENT DOCUMENTS

| | | | | |
|---|---|---|---|---|
| 6,230,267 | B1 * | 5/2001 | Richards et al. | 713/172 |
| 6,487,659 | B1 * | 11/2002 | Kigo et al. | 713/168 |
| 6,532,542 | B1 * | 3/2003 | Thomlinson et al. | 713/187 |
| 6,615,351 | B1 * | 9/2003 | Sedlak et al. | 713/172 |
| 6,742,117 | B1 * | 5/2004 | Hikita et al. | 713/172 |
| 6,747,546 | B1 * | 6/2004 | Hikita et al. | 340/10.31 |
| 6,859,535 | B1 * | 2/2005 | Tatebayashi et al. | 380/201 |
| 2002/0166058 | A1 * | 11/2002 | Fueki | 713/194 |

FOREIGN PATENT DOCUMENTS

| | | |
|---|---|---|
| DE | 3523237 A1 | 1/1987 |
| DE | 196 33 466 A1 | 9/1999 |
| EP | 0 955 603 A1 | 11/1999 |
| EP | 0 973 135 A2 | 1/2000 |
| WO | WO 98 52162 A | 11/1998 |

* cited by examiner

*Primary Examiner* — Nirav B Patel
(74) *Attorney, Agent, or Firm* — Rothwell, Figg, Ernst & Manbeck, P.C.

(57) ABSTRACT

In a method for reading initialization data (IND) into a chip card, the chip card receives an encrypted authentication value (EAV) and decrypts it to obtain at least one release key (ENK). The release key (ENK) is checked for a match with a release key (ENK') stored on the chip card (14). If there is a match, the initialization data (EIND, IND) are received and written to a nonvolatile memory of the chip card. A method for generating a record for initializing a chip card. a chip card and a computer-readable data carrier have corresponding features. The invention is provided in particular for initialization of chip cards by external partners of the chip card manufacturer, whereby as few possibilities of attack as possible are to be offered.

4 Claims, 3 Drawing Sheets

INITIALIZATION OF A CHIP CARD

This application is a §371 of PCT application Serial No. PCT/EP02/09561, filed Aug. 27, 2002.

BACKGROUND OF THE INVENTION

1. Field of the Invention

This invention relates to the technical field of initialization of a chip card and in particular to the compilation and processing of a record that is read into the chip card in an initialization step.

2. Description of the Background Art

Chip cards are well known in many embodiments. They are used for example for access control or in payment transactions and normally have a semiconductor chip with a microcontroller and at least one memory. Besides the usual designs in checkcard size or as small card modules (e.g. SIMs—subscriber identity modules in mobile phones), chip cards are also produced in other designs (e.g. as key pendants or rings). All these embodiments are to be referred to as "chip cards" in the present text.

During production of chip cards, initialization is the method step by which, after completion and successful testing of the chip card hardware, those programs and/or data are imported into the chip card that are identical for a relatively large number of chip cards. The subsequent step of loading personal, individual data is referred to as personalization.

The separation of these two steps is effected for reasons of production engineering to minimize the quantity of data to be transferred individually into individual chip cards. In some cases of application, so-called post-initialization is inserted between the steps of initialization and personalization, by which additional programs and/or data are written into a relatively small number of chip cards. An overview of these production steps and their delimitation is found in Chapter 10.4 (pages 584 to 592) of the book "Handbuch der Chipkarten" by Wolfgang Rankl and Wolfgang Effing, 3rd edition 1999.

According to an at least internal prior art of the applicant, chip cards for the GSM mobile phone system contain a 32-byte release key in a mask-programmed ROM of the chip card. To start the initialization process a data value matching the release key must be transferred to the chip card with a suitable command (e.g. VERIFY INITIALIZATION KEY). The transferred value is compared with the release key stored in the chip card ROM. In case of a match, access is released to an EEPROM of the chip card and all chip card commands required for initialization.

Subsequent loading of initialization data into the chip card can be done either openly or encrypted with a load key. Encrypted loading ensures that the privacy of the encrypted initialization data is retained in case of unauthorized access.

However, this system still involves the problem that the release key must be known to the authority performing initialization. It is increasingly required that not only the chip card manufacturer itself but also external partners (e.g. mobile phone network operators) initialize chip cards on their own. In this case there is a danger of the release key being spied out during transfer to the external partner or when it is read into the chip card, or of the external partner not keeping the release key strictly secret.

If the release key were made accessible to unauthorized persons a whole chip card product line might possibly be compromised, because the release key permits access to diverse basic chip card functions which can in turn be used for spying out the chip card's hardware and software. For example, if an unauthorized third person knows the release key he can load his own program code into the chip card and thus spy out the code already located in the mask-programmed ROM.

German laid-open print DE 196 33 466 A1 discloses a method for post-initialization of chip cards. This method, like the procedure described above in connection with initialization, uses a key to release certain commands of the chip card operating system.

German laid-open print DE 199 02 722 A1 shows a cryptographic method for exchanging a secret initial value between a processing station and a chip card, which avoids transfer of the initial value in plaintext.

European laid-open print EP-A 0 955 603 discloses a method by which a private key of the card manufacturer is sent to the initializing authority in encrypted form for reading in initialization data. In the chip card the decrypted private key is compared with the stored private key and if there is a match the initialization with the initialization data is allowed.

SUMMARY OF THE INVENTION

The problem of the invention is to at least partly avoid the stated problems and to provide a way to initialize chip cards that is suitable in particular for initialization performed by external partners, while offering few or no possibilities of attack. In particular the risk is to be reduced of an unauthorized person gaining access to the protected initialization commands and/or of unauthorized loading of program codes into the chip card.

To solve this problem, methods and apparatuses having the features of the independent claims are provided according to the invention.

An embodiment of the invention includes the steps executed by the chip card when reading in the initialization record. An embodiment of the invention includes a chip card designed for executing said steps. An embodiment of the invention includes the method executed by the chip card manufacturer to obtain a suitable record for executing the inventive chip card initialization. An embodiment of the invention includes a computer-readable data carrier having such a record. An embodiment of the invention includes the inventive overall method which is substantially composed of the two "mirror-inverted" portions of generating the initialization record and evaluating it.

The invention is based on the idea of neither making the release key accessible to the external partner in plaintext nor transferring it to the chip card in plaintext. Rather, the release key (optionally together with further information) is incorporated into an authentication value, and the authentication value is transferred exclusively in an encrypted state from the manufacturer to the external partner and from the external partner's processing station to the chip card.

The invention offers considerable advantages due to the fact that the release key is not transferred either to the external partner or to the chip card in plaintext and is also inaccessible to the external partner. This reliably avoids unauthorized access to the initialization commands of the chip card.

The security of the total chip card system, which is also based on the safe secrecy of the internal structures and internal programming of the chip card, is thus increased, while external partners are simultaneously given the possibility to execute initialization processes on their own premises. This increases the acceptance of the chip card system e.g. with GSM network operators, and broadens the possible application range of chip cards to areas of use in which external initialization of the chip card is required or desirable.

The order in which steps are listed is not intended to be restrictive. Rather, embodiments of the invention are provided in which said steps are executed in a different order or parallel or quasi-parallel (interleaved).

A "computer-readable data carrier" in the sense used here is intended to include not only material data carriers, such as magnetic or optical disks or tapes, but also immaterial data carriers, such as voltage signals or optical signals with data information modulated thereupon.

In the wording of the present text, the term "initialization" is to refer preferably to the abovementioned transfer of programs and data to a relatively large number of chip cards. In other embodiments of the invention, however, the term "initialization" is to be understood more broadly, including not only initialization in the narrower sense but also post-initialization and/or personalization. In the present text, "initialization data" refers not only to data in the narrower sense, but also to programs, program fragments and commands.

According to the invention, a match is checked between a received release key and a release key stored on the chip card. The term "match" refers here preferably to identity of the two release keys. In other embodiments of the invention, however, another relation can be required between the two release keys. This other relation (e.g. that the two release keys are complementary) is referred to as a "match" in these embodiments. If the match has been detected, the initialization data are written to a memory, preferably an EEPROM or a nonvolatile RAM.

In preferred embodiments of the invention, it is provided that the initialization data are transferred not in plaintext but as encrypted initialization data. The information required for decryption is contained in the authentication value or derivable therefrom. This information can be in particular a load key for decrypting the encrypted initialization data. Encrypted transfer of the initialization data has the advantage that the chip card manufacturer's trade secrets contained in said initialization data are safely guarded. Moreover, purposeful falsification of the initialization data is impeded even further.

In preferred embodiments of the invention, one or more initialization parameters contained in the authentication value influence the loading of the initialization data (e.g. by one of several practicable encryption methods being set). Alternatively or additionally it is provided in further embodiments of the invention that the initialization parameters influence the further run of initialization and/or the later functionality of the chip card. For example, the initialization parameters can make a selection between several algorithms located in the mask-programmed ROM of the chip card for certain later functions of the chip card. This embodiment once again considerably increases the application range of the invention.

To protect the authentication value from unauthorized manipulation, either the total authentication value or individual parts thereof (the release key and/or the load key and/or the initialization parameters) are secured by a cryptographic check sum in preferred embodiments of the invention.

In preferred embodiments of the inventive methods as well as of the inventive chip card and inventive data carrier, these have features corresponding to the features described above or those defined in the dependent claims.

BRIEF DESCRIPTION OF THE DRAWINGS

Further features, properties and advantages of the invention will result from the following description of an embodiment and several alternative embodiments. In the schematic drawings.

DETAILED DESCRIPTION OF THE INVENTION

Figure 1:
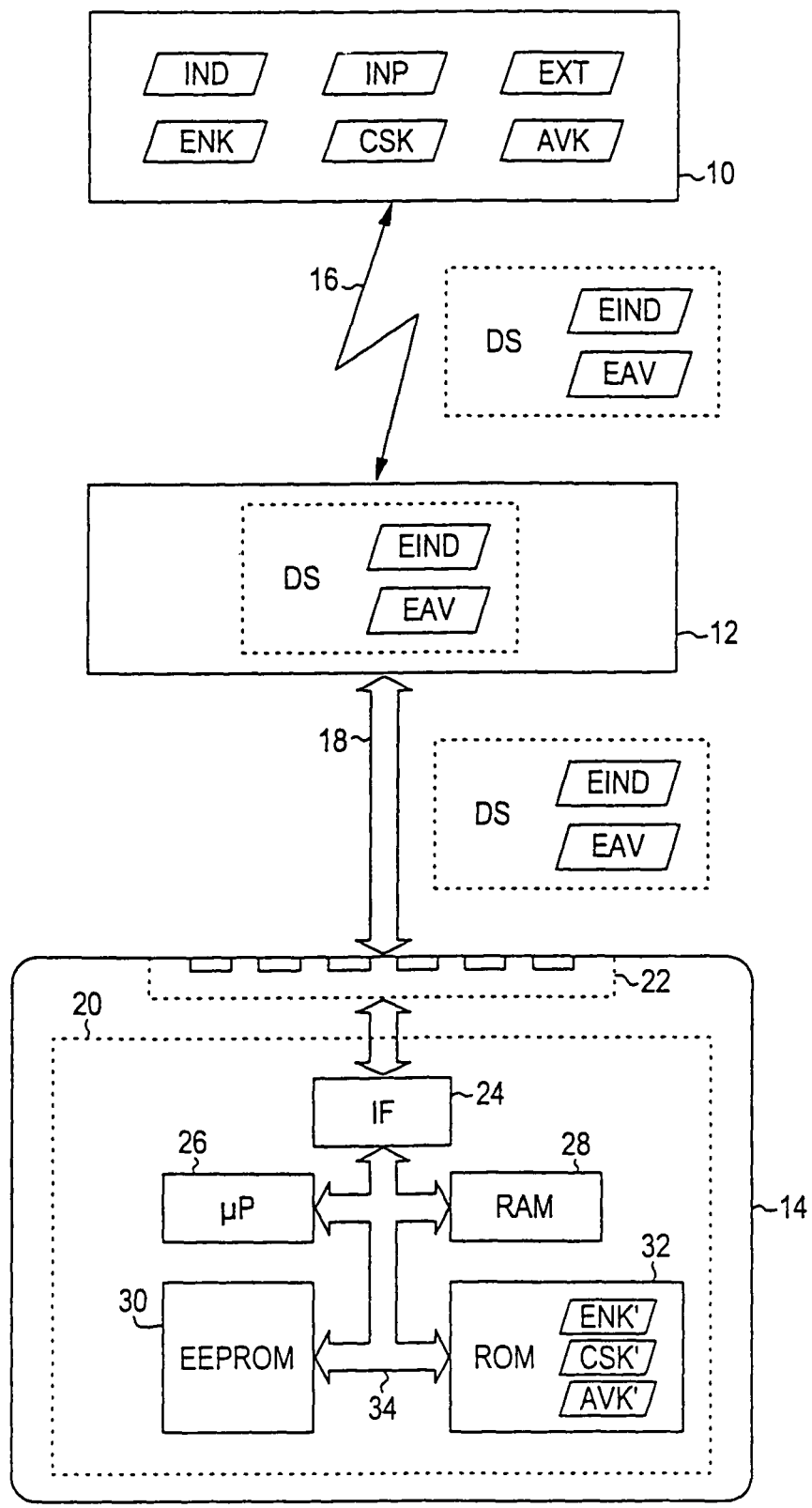
FIG. 1 shows an overview of the components and data communication paths involved in the overall method.

FIG. 1 shows schematically manufacturer station 10, processing station 12 and chip card 14. Manufacturer station 10 is disposed with the manufacturer of chip card 14, while processing station 12 and chip card 14 are located with an external partner of the chip card manufacturer. Between manufacturer station 10 and processing station 12 there is data transmission path 16, which can be realized for example as an electronic communication path via a telephone line or by the exchange of data carriers. Chip card 14 is connected to processing station 12 via wire connection 18.

Components of chip card 14 are semiconductor chip 20 and contact bank 22 whose contacts are connected to wire connection 18. Semiconductor chip 20 has, in the way known in the art, interface circuit 24, microcontroller 26, read-write memory 28 (RAM=random access memory), nonvolatile memory 30 and mask-programmed read-only memory 32 (ROM). Nonvolatile memory 30 is designed in the present embodiment as an electrically erasable read-only memory (EEPROM). The stated functional blocks of semiconductor chip 20 are interconnected by bus 34. Interface circuit 24 is moreover connected to contact bank 22.

The hitherto described embodiment of chip card 14 is known in the art. It is likewise known that read-only memory 32 has given release key ENK'. Chip card 14 shown in FIG. 1 differs from the prior art, however, in that check sum key CSK' and authentication value key AVK' are also provided in mask-programmed read-only memory 32 of chip card 14. Authentication value key AVK' serves to decrypt an authentication value to be described in detail below, while check sum key CSK' is provided for checking the integrity of said authentication value.

Manufacturer station 10 has access to initialization data IND, which normally contain both program instructions and data values, to be transferred to chip card 14 in the initialization process. Further, manufacturer station 10 has one or more initialization parameters INP and an identifier of external partner EXT. Finally, manufacturer station 10 also has data values for release key ENK, check sum key CSK and authentication value key AVK. Values ENK, CSK and AVK are identical to values ENK', CSK' and AVK' stored in chip card 14.

Figure 2:
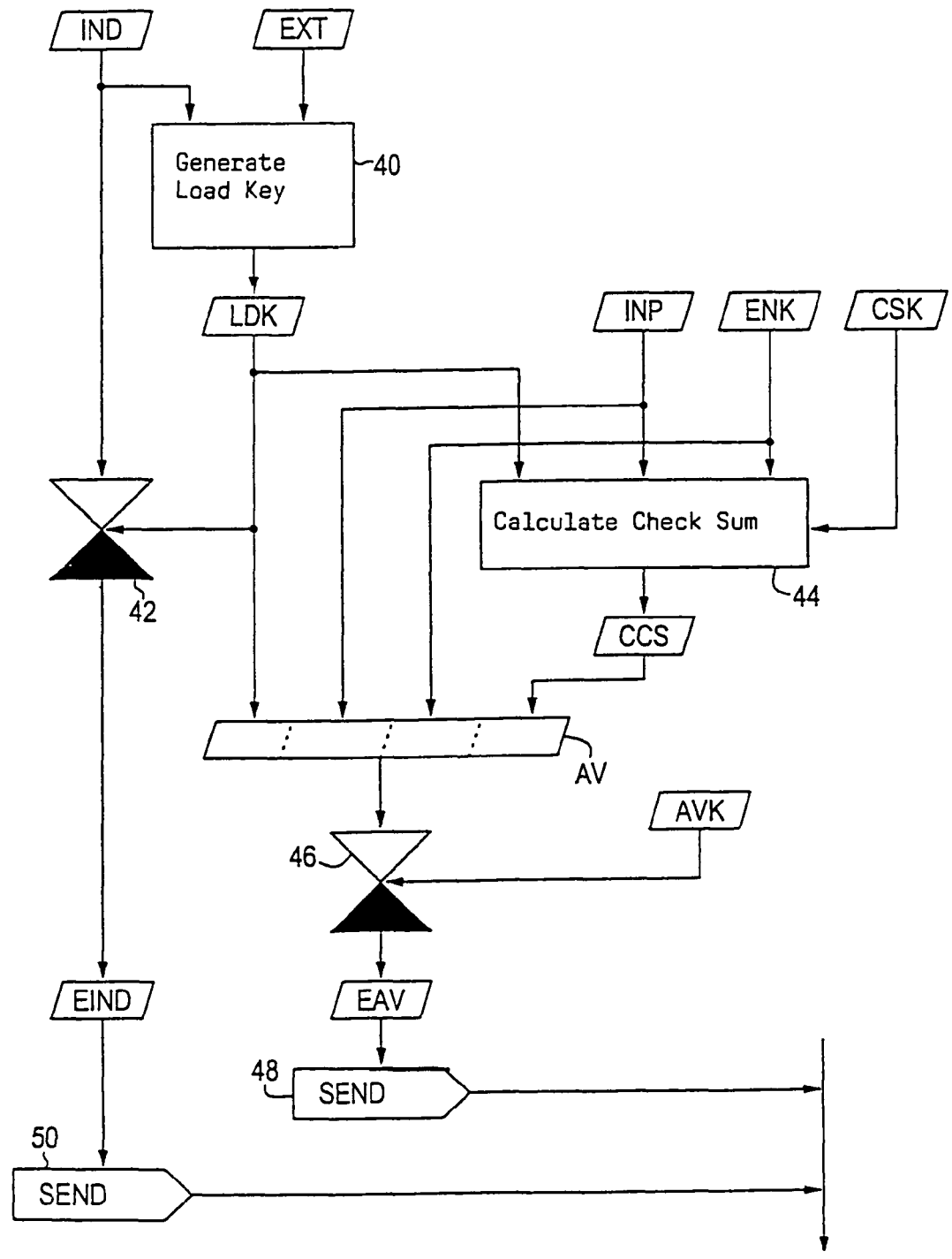
FIG. 2 shows a data flowchart of the method for creating the record used for chip card initialization.

When compiling record DS required for initialization, manufacturer station 10 executes a method that is shown in FIG. 2 and will be described more precisely below. The result of this method is that record DS has encrypted initialization data EIND and encrypted authentication value EAV. Record DS is transferred to processing station 12 and buffered there. Upon initialization of chip card 14, processing station 12 transfers record DS to chip card 14. There the received data are evaluated by the method shown in FIG. 3, which is likewise described more precisely below.

The method according to FIG. 2 is executed by manufacturer station 10. It starts out from given initialization data IND. From said data and the identifier of external partner EXT, load key LDK is generated in step 40. In the embodiment described here, load key LDK is a random value that is newly generated for each pair of values IND, EXT. In alternative embodiments, load key LDK can also be calculated by another method in step 40.

Load key LDK performs several functions. It firstly serves to encrypt initialization data IND in step 42 to obtain encrypted initialization data EIND. Secondly, load key LDK is a component of authentication value AV. Further components of authentication value AV are one or more initialization parameters INP and release key ENK.

In the embodiment described here, cryptographic check sum CCS is further calculated from the stated three values LDK, INP and ENK in step 44, using check sum key CSK as a key. The algorithm used for check sum calculation in the present embodiment is a MAC (message authentication code; see Chapter 4.6.4 of the above-cited book "Handbuch der Chipkarten") known in the art according to ISO 9797, while other calculation methods are provided in alternative embodiments. Cryptographic check sum CCS ensures the integrity of the data contained in authentication value AV.

In the embodiment described here, authentication value AV is the concatenation of values LDK, INP, ENK and cryptographic check sum CCS, while in alternative embodiments other methods are used for determining authentication value AV and authentication value AV can contain further and/or different and/or fewer data.

In further encryption step 46, authentication value AV is encrypted with authentication value key AVK to obtain encrypted authentication value EAV. The encryption method used in step 46 can be for example one of the DES or TRIPLE DES methods known in the art (DES=data encryption standard; see Chapter 4.6.1 of the above-cited book "Handbuch der Chipkarten"), preferably in the CBC mode (cipher block chaining) because this mode keeps the internal structures of authentication value AV hidden. Other encryption methods are provided for step 46 in alternative embodiments, however.

In two final method steps 48 and 50, first encrypted authentication value EAV and then encrypted initialization data EIND are sent to processing station 12 to be buffered there and finally passed to chip card 14. Said encrypted data EAV and EIND together form record DS shown in FIG. 1, which can contain further components in alternative embodiments.

Figure 3:
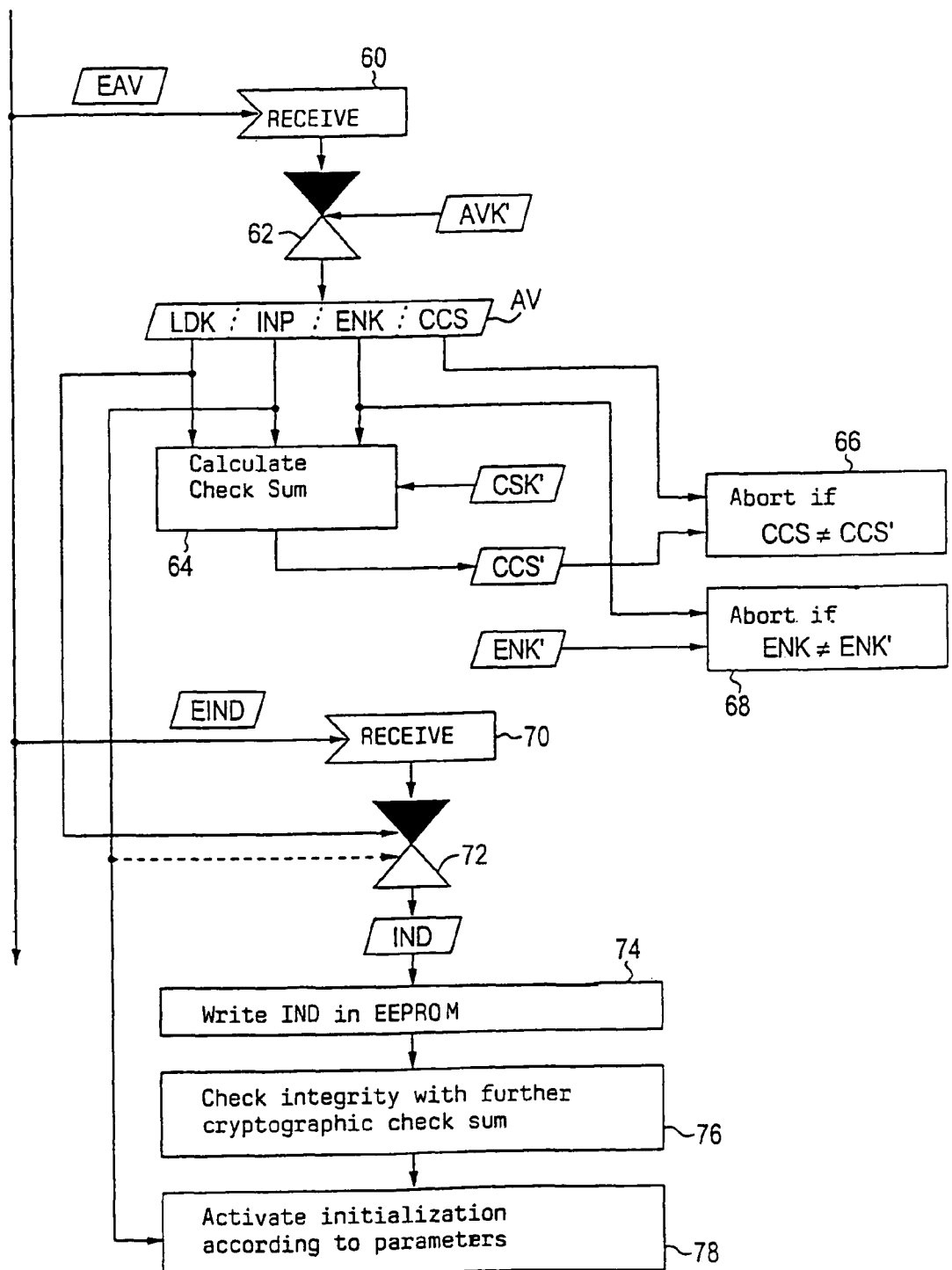
FIG. 3 shows a data flowchart of the method executed by the chip card during initialization.

FIG. 3 relates to the reception and processing of record DS (FIG. 1) by chip card 14. In step 60, chip card 14 first receives encrypted authentication value EAV, which originally comes from manufacturer station 10 and was transferred to processing station 12. Encrypted authentication value EAV is decrypted with authentication value key AVK' stored in read-only memory 32 of chip card 14 in step 62 to obtain authentication value AV with components LDK, INP, ENK and CCS. To simplify the present description it will be assumed that no falsification of record DS has taken place so that authentication value AV calculated in step 62 is identical with authentication value AV shown in FIG. 2.

A check sum calculation is again effected (step 64), thereby determining cryptographic check sum CCS' from components LDK, INP and ENK using check sum key CSK' stored in chip card 14. Authentication value AV is rejected as faulty and the method aborted if a deviation of calculated check sum CCS' from check sum CCS contained in decrypted authentication value AV is detected in step 66.

If check sum calculation was successful, release key ENK contained in decrypted authentication value AV is compared in further step 68 with release key ENK' stored in mask-programmed read-only memory 32 of chip card 14. If said comparison is also positive, the further loading of the initialization is released; otherwise the process is aborted. In alternative embodiments, steps 66 and 68 can be performed in a different order.

If the initialization process is continued, chip card 14 receives encrypted initialization data EIND in step 70. Said data are decrypted in step 72, using load key LDK of calculated authentication value AV for decryption. The decryption method applied in step 72 can further depend on one or more of initialization parameters INP; for example, either DES or TRIPLE DES can be used depending on the parameter value. The decryption method in step 72 must of course match the method used for encryption in step 42 (FIG. 2). As the result of decryption step 72, chip card 14 obtains initialization data IND, which are written to nonvolatile memory 30 in step 74.

To simplify the representation FIG. 3 shows steps 70 to 74 sequentially, while these steps are interleaved in the embodiment described here, in order to comply with the limited memory space conditions of chip card 14.

After initialization data IND are loaded into nonvolatile memory 30, a further integrity check is effected in step 76 by means of a further cryptographic check sum in the way known in the art. If this integrity check is positive, initialization is activated in step 78. In the embodiment described here, one or more initialization parameters INP are used for finally parameterizing the initialization. For example, it can be provided that initialization parameters INP make a selection among several algorithms located in read-only memory 32 for authentication in the GSM system.

The invention claimed is
1. A method for reading initialization data into a chip card, comprising:
  receiving an encrypted authentication value (EAV),
  decrypting the encrypted authentication value (EAV) to obtain at least one release key (ENK) and at least one load key (LDK),
  checking whether the obtained release key (ENK) matches a release key (ENK') stored on the chip card, and
  if the release keys (ENK, ENK') match,
    receiving encrypted initialization data (EIND),
    decrypting the encrypted initialization data (EIND) using the load key (LDK), and
    writing the decrypted initialization data (IND) to a nonvolatile memory of the chip card.

2. A method according to claim 1, wherein the decryption of the encrypted authentication value (EAV) further obtains at least one initialization parameter (INP) which influences at least one of further read-in, initialization process or a later functionality of the chip card (14).

3. A method according to claim 1, characterized in that at least one of the release key (ENK), the load key (LDK) or the at least one initialization parameter (INP) are secured by a cryptographic check sum (CCS), the cryptographic check sum (CCS) being derivable from the authentication value (AV).

4. A chip card having a microcontroller, a read-only memory and a nonvolatile memory, wherein the microcontroller executes instructions to perform a method for reading initialization data into the chip card, the method comprising:
  receiving an encrypted authentication value (EAV),
  decrypting the encrypted authentication value (EAV) to obtain at least one release key (ENK) and at least one load key (LDK
  checking whether the obtained release key (ENK) matches a release key (ENK') stored on the chip card, and
  if the release keys (ENK, ENK') match,
    receiving encrypted initialization data (EIND), decrypting the encrypted initialization data (EIND) using the load key (LDK), and writing the decrypted initialization data (IND) to the nonvolatile memory.

* * * * *